(12) United States Patent
Gutti et al.

(10) Patent No.: US 10,838,830 B1
(45) Date of Patent: *Nov. 17, 2020

(54) DISTRIBUTED LOG COLLECTOR AND REPORT GENERATION

(71) Applicant: Palo Alto Networks, Inc., Santa Clara, CA (US)

(72) Inventors: Srinath Gutti, Sunnyvale, CA (US); Anupam Bharali, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/788,669

(22) Filed: Jun. 30, 2015

Related U.S. Application Data

(63) Continuation of application No. 13/631,804, filed on Sep. 28, 2012, now Pat. No. 9,104,745.

(51) Int. Cl.
*G06F 16/24* (2019.01)
*G06F 11/14* (2006.01)
*G06F 16/27* (2019.01)

(52) U.S. Cl.
CPC ...... *G06F 11/1471* (2013.01); *G06F 11/1451* (2013.01); *G06F 11/1464* (2013.01); *G06F 16/278* (2019.01); *G06F 2201/80* (2013.01); *G06F 2201/84* (2013.01)

(58) Field of Classification Search
CPC ......... G06F 17/30598; G06F 17/30017; G06F 17/30368; G06F 16/24552; G06F 21/554; G06F 16/901
See application file for complete search history.

(56) References Cited

U.S. PATENT DOCUMENTS

| | | | |
|---|---|---|---|
| 7,257,690 B1* | 8/2007 | Baird | G06F 11/1471 707/999.202 |
| 8,856,341 B2* | 10/2014 | Heumesser | G06F 9/5083 709/223 |
| 2002/0007468 A1* | 1/2002 | Kampe | H04L 12/2602 714/4.12 |
| 2002/0138762 A1* | 9/2002 | Horne | H04L 12/2602 726/25 |
| 2003/0188189 A1* | 10/2003 | Desai | H04L 63/104 726/23 |
| 2007/0124437 A1* | 5/2007 | Chervets | H04L 41/0681 709/223 |
| 2010/0083382 A1* | 4/2010 | Farley | G06F 21/577 726/24 |
| 2012/0197934 A1* | 8/2012 | Zhang | G06F 16/24568 707/770 |

(Continued)

OTHER PUBLICATIONS

"Centralized Logging" Jason Wilder's Blog, Software developer and architect interested in scalability, performance and distributed systems, Jan. 3, 2012.*

*Primary Examiner* — Etienne P Leroux
*Assistant Examiner* — Cindy Nguyen
(74) *Attorney, Agent, or Firm* — Van Pelt, Yi & James LLP

(57) ABSTRACT

A distributed log collector and report generation architecture is disclosed. In some embodiments, a received query to generate a log report is forwarded to each of a plurality of log collector clusters, and responses to the query received from each of at least a subset of the plurality of log collector clusters are aggregated to generate the log report.

20 Claims, 5 Drawing Sheets

(56) References Cited

U.S. PATENT DOCUMENTS

| | | | |
|---|---|---|---|
| 2012/0210416 A1* | 8/2012 | Mihelich | H04L 63/0218 726/11 |
| 2012/0246303 A1* | 9/2012 | Petersen | G06F 17/30144 709/224 |
| 2013/0191185 A1* | 7/2013 | Galvin | G06Q 30/01 705/7.37 |

* cited by examiner

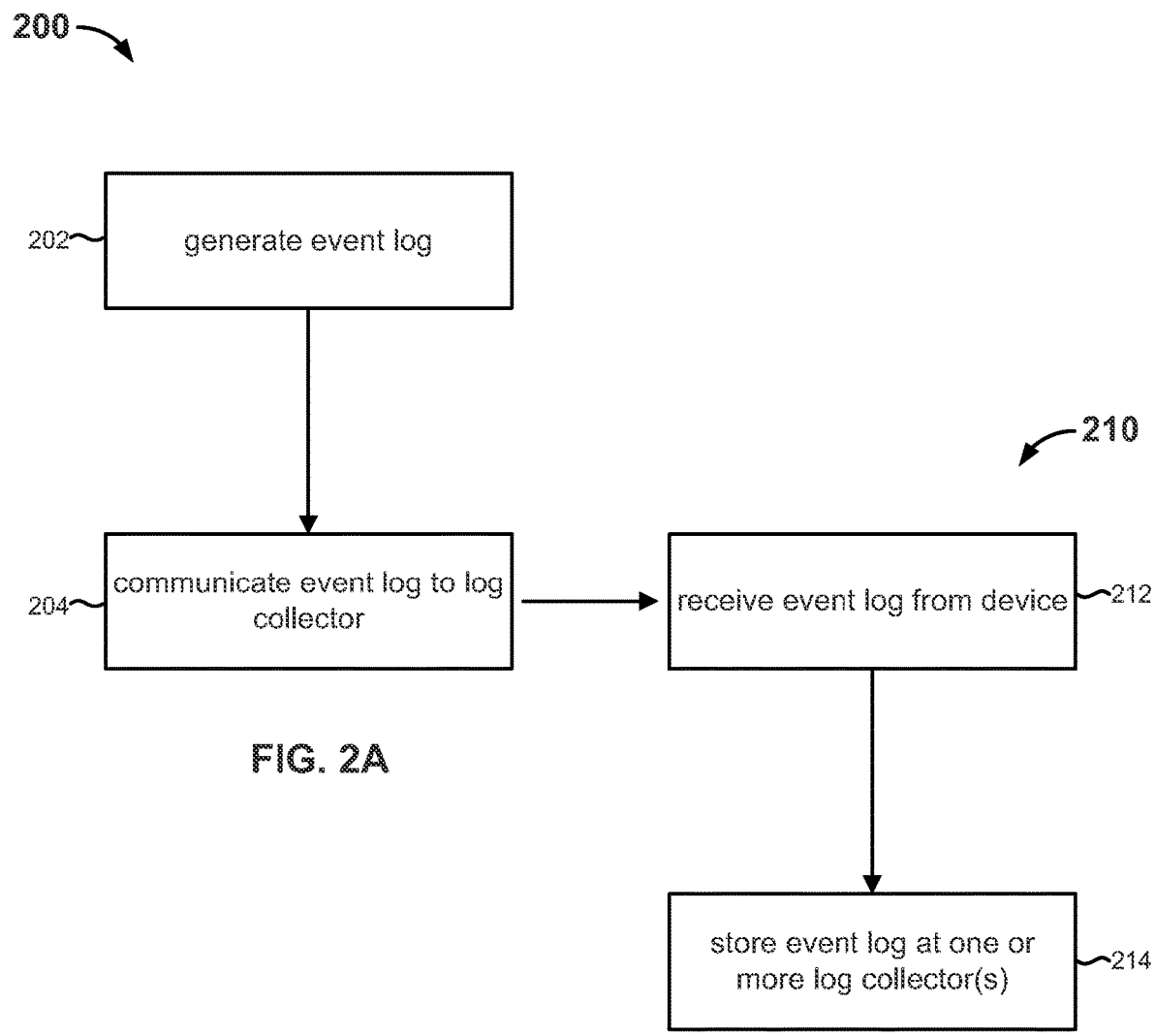

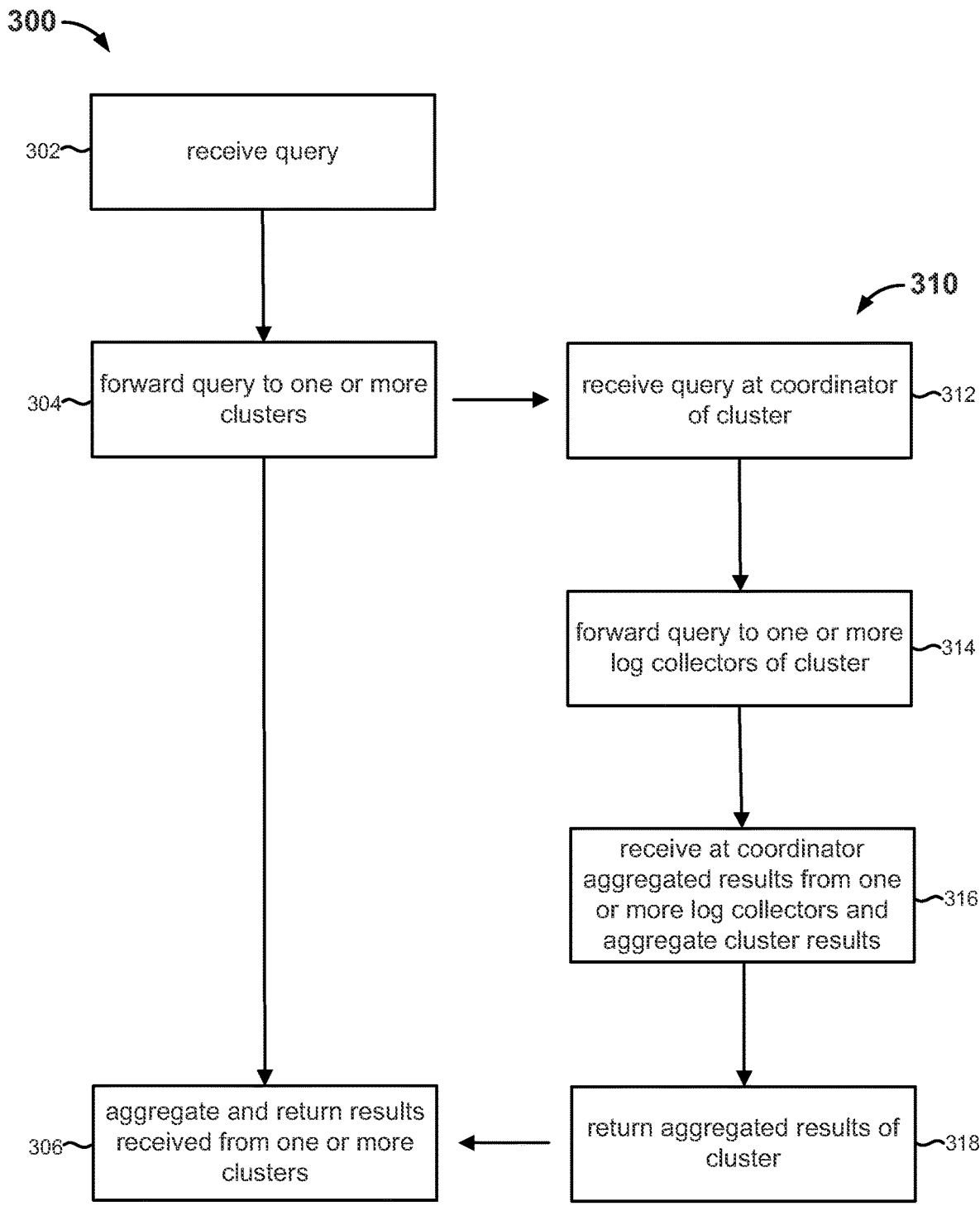

DISTRIBUTED LOG COLLECTOR AND REPORT GENERATION

This application is a continuation of co-pending U.S. patent application Ser. No. 13/631,804 entitled DISTRIBUTED LOG COLLECTOR AND REPORT GENERATION filed Sep. 28, 2012 which is incorporated herein by reference for all purposes.

BACKGROUND OF THE INVENTION

Existing logging system solutions such as a single server/appliance system with a database on a single server, a replicated server/appliance system with a database on a single server replicated for redundancy and load balancing, and a distributed server/appliance system with a database on multiple servers suffer numerous drawbacks such as no or very limited scalability and fault tolerance.

BRIEF DESCRIPTION OF THE DRAWINGS

Various embodiments of the invention are disclosed in the following detailed description and the accompanying drawings.

FIG. 2A is a flow chart illustrating an embodiment of a process for communicating log data to a log collector.

FIG. 2B is a flow chart illustrating an embodiment of a process for storing log data received from a device.

FIGS. 3A-3B are flow charts illustrating embodiments of processes for retrieving relevant stored log data.

DETAILED DESCRIPTION

Figure 1A:
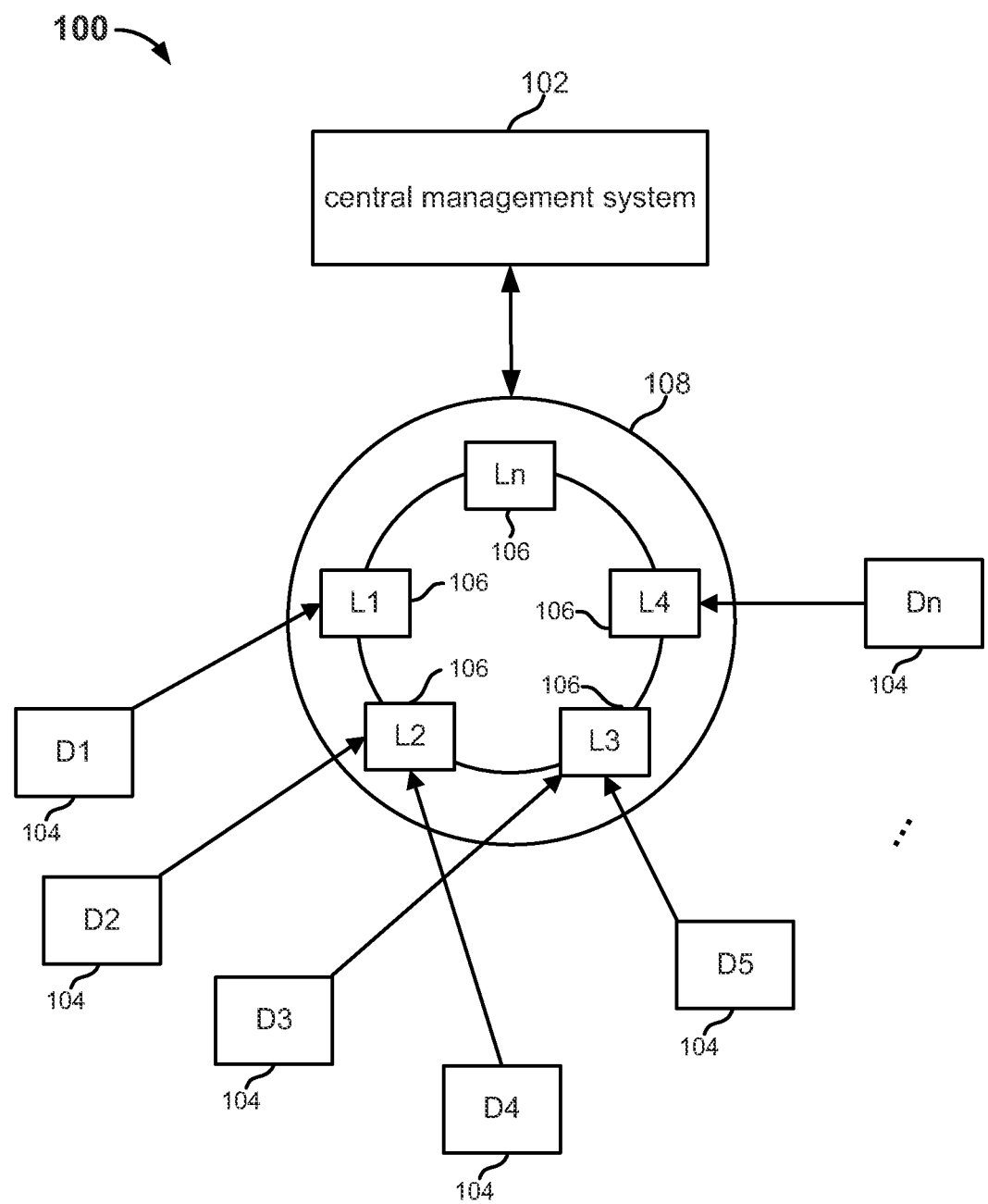
FIG. 1A is a high level block diagram illustrating an embodiment of a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Security appliances, such as firewalls, generate a large number of event logs. The event logs contain valuable information that, for example, may provide insights into activities and/or trends of an associated network and may be employed for forensic purposes. The typically rapid rate of generation of such events poses a challenge in storing event data in a manner that allows efficient retrieval of the data at a later time. For instance, a typical firewall generates several thousands of event logs per second, which at a size of ~1 KB per event, will result in several MBs of data to be stored on disk and indexed for efficient querying per second. Due to practical limitations to disk write speeds, an event storage system quickly reaches its capacity with just a handful of firewalls. In an enterprise network, storing and retrieving logs from a large number of firewalls is a major challenge.

A highly available and scalable event storage system, which, for example, may be deployed in an enterprise network, is disclosed. As further described herein, such an event storage system provides various features, such as, for example, supporting storage of a large number of event logs per second; retrieval of specific and/or aggregate information from among a large number of stored events; scalability to meet the demands of an associated network, e.g., by incrementally adding capacity as needed to preserve read and write rates as event generation rates increase; and redundancy so that partial hardware and/or software failures or network partitioning do not disable the entire system.

FIG. 1A is a high level block diagram illustrating an embodiment of a network environment 100. Central management system 102 configures and manages a plurality of network devices 104 as well as a plurality of log collectors 106. Although not explicitly illustrated, each of central management system 102, devices 104, and log collectors 106 comprises appropriate hardware (e.g., processor(s), memory, storage, network interfaces, etc.) and software components for providing the disclosed functionalities and are configured to communicate with one another via a network. Central management system 102, for example, may be deployed in an enterprise network comprising a plurality of firewall appliances 104 and may be employed to centrally define, configure, and/or manage firewall policies. Firewalls provide windows into inbound and outbound network traffic and serve as valuable network points at which to capture information related to traffic events that can be stored for later retrieval, analysis, and/or report generation. In network environment 100, event logs generated by firewall devices 104 are sent to log collector appliances 106 for indexing, replication, and storage.

A log collector 106 registration with central management system 102 includes a specification of logger capacity (e.g., storage, CPU, RAM, etc.) so that central management system 102 can appropriately distribute load across a plurality of log collectors 106. Central management system 102 or an administrator thereof facilitates provisioning of log collectors 106 to firewall devices 104. For example, each firewall device 104 is assigned a set of one or more log collectors 106. In some cases, the set of one or more log collectors 106 assigned to a firewall device 104 may be specified in a prescribed order so that the firewall device 104 tries to connect to an available log collector 106 in the order specified. In FIG. 1A, for instance, D1 may be assigned ordered list (L1, L2, L3, . . . , Ln); D2 may be assigned ordered list (L2, L3, L4, . . . , Ln, L1); D3 may be assigned ordered list (L3, L4, . . . , Ln, L1, L2); etc. Such a preference list of log collectors assigned to a firewall device may be based on various factors such as proximity, connection speed, etc.

Figure 1B:
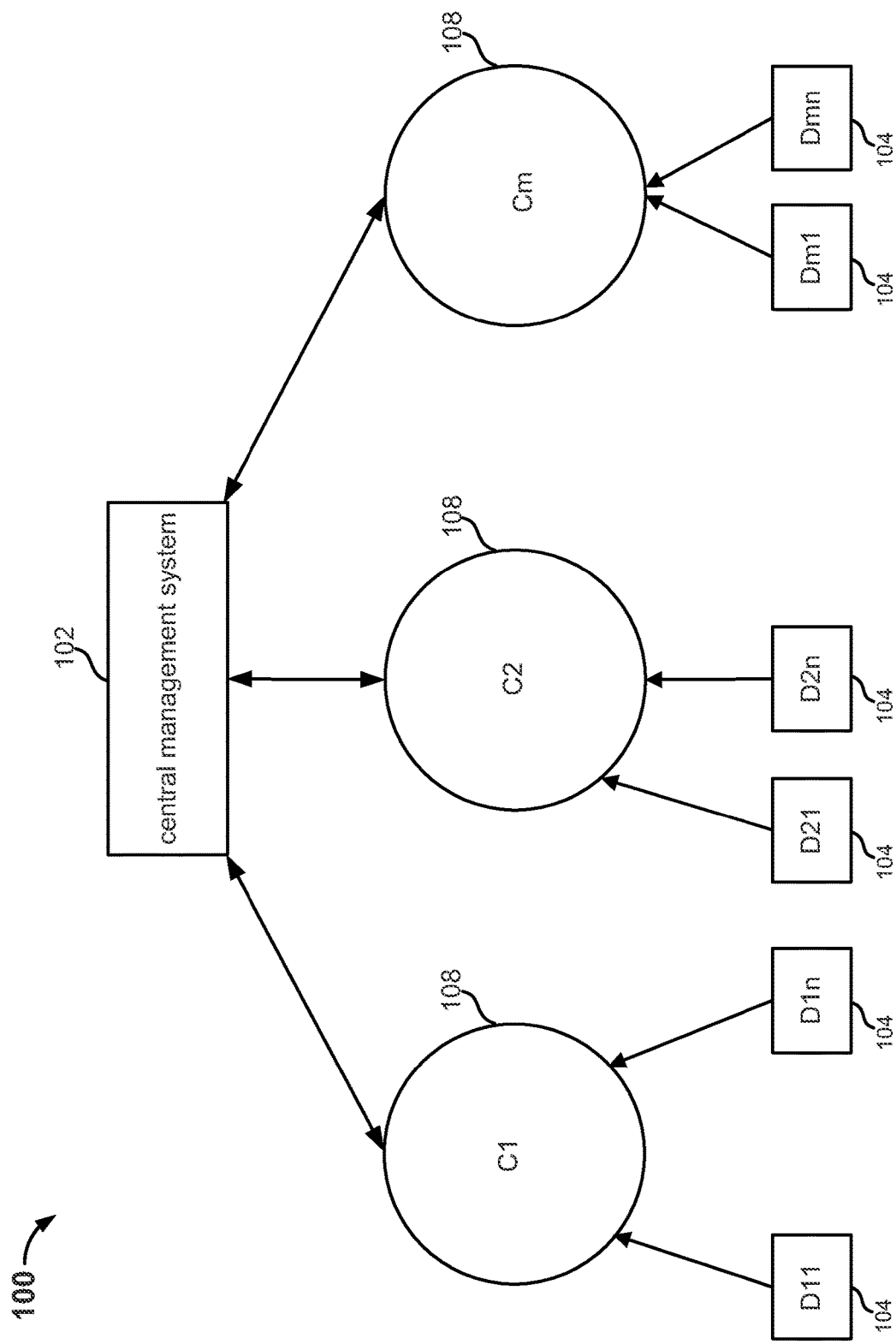
FIG. 1B is a high level block diagram illustrating an embodiment of a network environment in which log collectors are divided into a plurality of clusters.

In addition to mapping firewall devices 104 to log collectors 106, central management system 102 or an administrator thereof may facilitate partitioning of log collectors 106 into one or more clusters. For example, log collectors L1-Ln of FIG. 1A may belong to the same cluster 108. FIG. 1B is a high level block diagram illustrating an embodiment of a network environment in which log collectors are divided into a plurality of clusters 108, each of which may comprise one or more log collectors (not shown in FIG. 1B). Log collectors within a cluster 108 may distribute data among themselves to provide high availability and fault tolerance. In some cases, data associated with a cluster 108 is restricted to that cluster although it may be moved, replicated, or otherwise distributed within the cluster. In some embodiments, clusters 108 may reflect administrative or other boundaries across which data is not shared. Similar to the clustering described with respect to FIG. 1B, in some embodiments, a log collector device may be segmented into one or more virtual systems, and the one or more virtual systems may be assigned to one or more clusters. Such a technique allows multiple virtual systems of a single device to belong to multiple clusters, thus segmenting the data from their initial source.

Figure 1C:
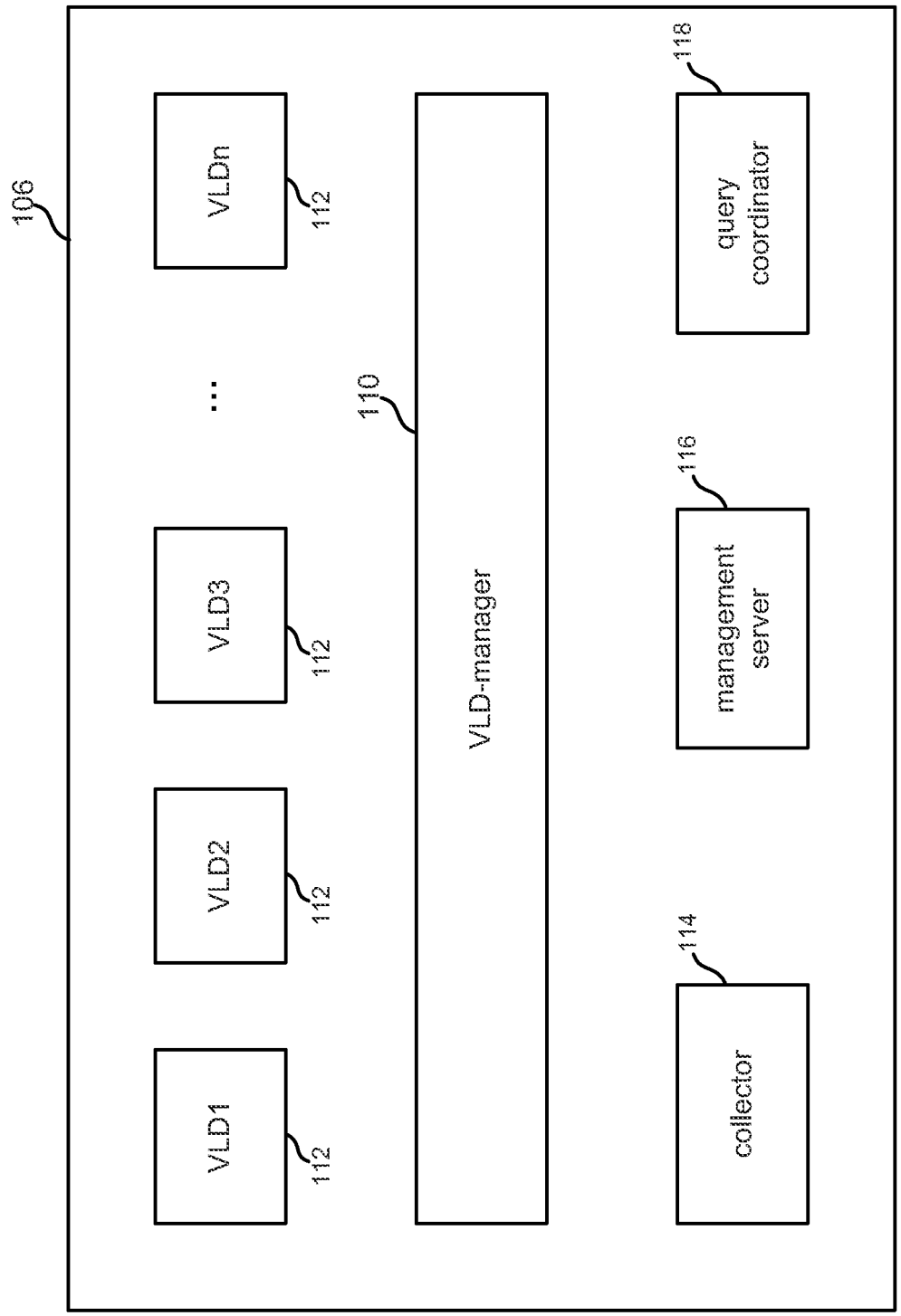
FIG. 1C is a high level block diagram illustrating an embodiment of log collector components.

In some embodiments, each log collector appliance 106 comprises one or more virtual log collectors, each of which comprises a separate process associated with and responsible for a particular disk or RAID pair. Multiple threads inside the associated database code of a log collector, for example, aids in facilitating distribution of read/write load across threads to take advantage of multi-core CPUs. Virtual loggers facilitate fault isolation since a disk or RAID pair failure does not result in the failure of other disks and RAID pairs. Moreover, virtual loggers facilitate seamless scalability since a disk or RAID pair may be added or removed without bringing down other disks or RAID pairs. FIG. 1C is a high level block diagram illustrating an embodiment of log collector components. As depicted, log collector 106 includes a VLD (virtual logger daemon) manager 110 configured to manage a plurality of VLDs 112, each of which is responsible for a single disk or RAID pair. In this embodiment, log collector 106 further includes a collector 114 for processing logs for storage, management server 116 for managing communications, and query coordinator 118 for handling query processing.

FIG. 2A is a flow chart illustrating an embodiment of a process for communicating log data to a log collector. For example, process 200 may be employed by a firewall device 104 of FIGS. 1A-1B. At step 202, log data is generated, for example, in response to an event. An event log may comprise different types of information based on the event type for which it is generated. For example, an event log may comprise data associated with traffic, threats, URLs, configurations, the corresponding system, etc. At step 204, the event log is communicated to an assigned log collector (i.e., an inbound logger). In various embodiments, the event log may be communicated to an assigned log collector in nearly real time at the time of generation or as part of a log buffer that includes data accumulated from a plurality of event logs. A log buffer may comprise event log data spanning one or more time periods or intervals.

FIG. 2B is a flow chart illustrating an embodiment of a process for storing log data received from a device. For example, process 210 may be employed by a log collector 106 of FIGS. 1A-1C. At step 212, an event log is received, for example, at an inbound logger assigned to a device at which the event log is generated. In various embodiments, the event log may be received by itself or as part of a log buffer. At step 214, the received event log data is stored at one or more log collectors (or with respect to one or more virtual log collectors thereof) of an associated cluster. That is, step 214 comprises writing the log data to one or more (virtual) loggers of the cluster. The event log may or may not be stored at step 214 at the inbound logger, i.e., the log collector that receives the event log at step 212. In various embodiments, the event log may be stored by itself or as part of a segment or block of data that, for example, includes data from a plurality of event logs. In some cases, for instance, a plurality of logs from one or more devices are aggregated to form a block of data that is then stored at one or more (virtual) loggers at step 214. Logs accumulated into blocks before writing and/or replication, for example, may facilitate improved write throughputs. Moreover, log blocks may be compressed before being written to disk to facilitate improved read and write efficiencies. Furthermore, logs may be indexed incrementally before being written to disk, eliminating the need to read logs back for indexing and resulting in improved disk efficiency. Compression and indexing operations may be performed in parallel and in multiple threads balanced by load, resulting in the ability to employ multi-core CPUs to the fullest efficiency.

A block may comprise a prescribed (tunable) size (e.g., 10 MB) and/or may comprise data corresponding to a prescribed (tunable) time period or interval. In some embodiments, process 210 may be modified to comprise receiving a plurality of log buffers that include data from one or more time intervals from one or more devices, parsing the log buffer data based on time, aggregating data corresponding to a prescribed time bucket received from one or more devices into the same block, and storing the block of data at one or more (virtual) loggers of an associated cluster. Such blocks of data that are indexed by time are amenable to querying based on time. In various embodiments, event logs may be aggregated into and stored in blocks based on any one or more parameters such as time, event type, source/destination device, etc., so that the stored log data is amenable to search based on such parameters. Step 214 may include any one or more appropriate load balancing or distribution techniques, such as consistent hashing, to store data across one or more (virtual) log collectors of an associated cluster. Moreover, step 214 may include replication of data to facilitate increased availability of data in the cluster. For example, the same event log or associated block of data may be stored at or written to a plurality of (virtual) loggers of the cluster.

In addition to storing (i.e., writing) data, a log collector is capable of retrieving (i.e., reading) data that it and/or other log collectors of an associated cluster have that satisfy a query. FIGS. 3A-3B are flow charts illustrating embodiments of processes for retrieving relevant stored log data in the network environment of FIGS. 1A-1B. For example, process 300 of FIG. 3A may be employed by a central management system 102 while process 310 of FIG. 3B may be employed by a log collector 106 of FIGS. 1A-1C. Process 300 starts at step 302 at which a query is received, for example, from a process or an end user. The query may be received via an interface provided by the central management system to query data stored on multiple clusters managed by the central management system in an aggregated manner. At step 304, the received query is forwarded to one or more appropriate log collector clusters. In some cases, the central management system selects a particular log collector of a cluster as a coordinator for responding to a query forwarded by the central management system. Process 310 starts at step 312 at which a query is received, for example, from the central management system at a log collector (i.e., a coordinator) of a cluster. At step 314, the query received at step 312 is forwarded to one or more appropriate log collectors within the cluster. Each log collector may, in turn, forward the query to one or more processes managing individual disk pairs and aggregate results for that collector. At step 316, the coordinator of the cluster receives aggregated results from one or more collectors to which the query was forwarded at step 314 and aggregates the results for the cluster. At step 318, the aggregated results of the cluster are returned by the coordinator to the central management system. Returning to process 300, at step 306, aggregated results returned by one or more clusters to which the query was forwarded at step 304 are aggregated and returned, for example, to the source of the query received at step 302. For example, in some cases, step 306 includes generating and returning a report that includes data that satisfies the query. During query processing, the central management system itself functions as a coordinator across multiple clusters. In various embodiments, aggregating results at a collector, a coordinator of a cluster, and/or the central management system may include analyzing, organizing, or otherwise processing or formatting the results. The described divide-and-conquer approach for executing a query as well as possibly employing separate disk pairs at the lowest point of distribution of the query facilitate improved read rates for the stored log data.

The disclosed distributed log collector and report generation architecture provides various advantageous features such as scalability and availability. Incremental read/write scaling is supported. For example, more collectors may be added to the clusters to increase read/write capacity. The addition of a new collector to a well-balanced cluster (i.e., a cluster in which read and write loads are substantially equally distributed across collectors of the cluster) results in a portion of the data stored on each of one or more of the existing collectors to be offloaded appropriately to the new collector so that substantially equal load distribution for read operations can be maintained. Furthermore, due to (pseudo) random assignments of storage destinations, any new data stored on the cluster is substantially equally distributed among the collectors of the cluster, including the newly added collector, resulting in substantially equal load distribution for write operations. Thus, the addition of a new collector, by induction, results in incremental scalability. Similarly, removing a log collector from a cluster (substantially evenly) adds read/write load to each of one or more remaining log collectors in the cluster. Moreover, fault tolerance and high availability for reads/writes is supported. Since no master device exists in a logger cluster, no single point of failure exists. Rather, faults are isolated to single systems or single drive pairs while the rest of the system continues to operate normally. A configurable data replication factor provides a way to tune fault tolerance and provide read availability. Even when a collector is offline (e.g., due to network connectivity issues or software, hardware, or other failures), other collectors that have the same data can serve read operations. Any writes destined for an unavailable collector may be temporarily stored on other collectors and transferred to the intended collector upon reconnection. Thus, (temporary) failures of collectors do not result in non-availability of the overall system. Although the disclosed architecture has been described with respect to firewall generated log records, the techniques disclosed herein may be similarly adapted to non-security appliances for efficient storage and reporting of data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
configuring devices of an enterprise network to communicate generated log data to assigned log collectors within the enterprise network, wherein a set of log collectors associated with a prescribed cluster is assigned to each device in an ordered list based on network proximity and each device connects with an available assigned log collector in a prescribed order specified by an associated ordered list; and
configuring each log collector to index and store log data received from a plurality of devices at one or more of the log collectors and to retrieve stored log data in response to applicable queries;
wherein log data from the devices is distributively indexed and stored at the log collectors, wherein the log collectors are organized into a plurality of clusters, and wherein log data is replicated within each cluster to provide redundancy.

2. The method of claim 1, wherein log data is aggregated into and stored in blocks based on one or more parameters.

3. The method of claim 1, wherein the plurality of clusters does not share data.

4. The method of claim 1, wherein a log collector comprises a virtual log collector.

5. The method of claim 1, wherein a log collector comprises a plurality of virtual log collectors.

6. The method of claim 1, further comprising generating a report aggregating log data received from at least a subset of the log collectors that satisfies a received query of stored log data.

7. The method of claim 1, wherein the devices comprise firewall appliances.

8. A system, comprising:
a processor to:
configure devices of an enterprise network to communicate generated log data to assigned log collectors within the enterprise network, wherein a set of log collectors associated with a prescribed cluster is assigned to each device in an ordered list based on network proximity and each device connects with an available assigned log collector in a prescribed order specified by an associated ordered list; and
configure each log collector to index and store log data received from a plurality of devices at one or more of the log collectors and to retrieve stored log data in response to applicable queries;
wherein log data from the devices is distributively indexed and stored at the log collectors, wherein the log collectors are organized into a plurality of clusters, and wherein log data is replicated within each cluster to provide redundancy; and
a memory coupled to the processor and configured to provide the processor with instructions.

9. The system of claim 8, wherein log data is aggregated into and stored in blocks based on one or more parameters.

10. The system of claim 8, wherein the plurality of clusters does not share data.

11. The system of claim 8, wherein a log collector comprises a virtual log collector.

12. The system of claim 8, wherein a log collector comprises a plurality of virtual log collectors.

13. The system of claim 8, wherein the processor is further configured to generate a report aggregating log data received from at least a subset of the log collectors that satisfies a received query of stored log data.

14. The system of claim 8, wherein the devices comprise firewall appliances.

15. A computer program product, the computer program product being embodied in a non-transitory computer readable storage medium and comprising computer instructions for:

configuring devices of an enterprise network to communicate generated log data to assigned log collectors within the enterprise network, wherein a set of log collectors associated with a prescribed cluster is assigned to each device in an ordered list based on network proximity and each device connects with an available assigned log collector in a prescribed order specified by an associated ordered list; and configuring each log collector to index and store log data received from a plurality of devices at one or more of the log collectors and to retrieve stored log data in response to applicable queries;

wherein log data from the devices is distributively indexed and stored at the log collectors, wherein the log collectors are organized into a plurality of clusters, and wherein log data is replicated within each cluster to provide redundancy.

16. The computer program product of claim 15, wherein log data is aggregated into and stored in blocks based on one or more parameters.

17. The computer program product of claim 15, wherein the plurality of clusters does not share data.

18. The computer program product of claim 15, wherein a log collector comprises a virtual log collector.

19. The computer program product of claim 15, wherein a log collector comprises a plurality of virtual log collectors.

20. The computer program product of claim 15, further comprising computer instructions for generating a report aggregating log data received from at least a subset of the log collectors that satisfies a received query of stored log data.

\* \* \* \* \*